US011254787B2

(12) United States Patent
Al-Anazi et al.

(10) Patent No.: US 11,254,787 B2
(45) Date of Patent: Feb. 22, 2022

(54) METHOD OF PREPARING FATTY ACID MONOESTER OF POLYOXYETHYLENE, ESTER MADE THEREWITH, AND USES THEREOF

(71) Applicant: SABIC Global Technologies B.V., Bergen op Zoom (NL)

(72) Inventors: Flaiyh Al-Anazi, Riyadh (SA); Mohammed Bakalla, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 49 days.

(21) Appl. No.: 16/639,814

(22) PCT Filed: Aug. 17, 2018

(86) PCT No.: PCT/IB2018/056243
§ 371 (c)(1),
(2) Date: Feb. 18, 2020

(87) PCT Pub. No.: WO2019/035090
PCT Pub. Date: Feb. 21, 2019

(65) Prior Publication Data
US 2020/0247946 A1     Aug. 6, 2020

Related U.S. Application Data

(60) Provisional application No. 62/546,709, filed on Aug. 17, 2017.

(51) Int. Cl.
*C08G 63/00* (2006.01)
*C08G 63/91* (2006.01)

(52) U.S. Cl.
CPC .................. *C08G 63/912* (2013.01)

(58) Field of Classification Search
USPC .............................................. 528/425; 162/5
See application file for complete search history.

(56) References Cited

U.S. PATENT DOCUMENTS

| | | | |
|---|---|---|---|
| 2,528,136 | A | 10/1950 | Goldstein et al. |
| 2,871,261 | A | 1/1959 | Klaui |
| 3,939,088 | A | 2/1976 | Goldschmidt et al. |
| 4,915,786 | A | 4/1990 | Sweeney |

| | | | |
|---|---|---|---|
| 2002/0121346 | A1* | 9/2002 | Nishizaki ............. B03D 1/0043 162/5 |
| 2010/0317824 | A1 | 12/2010 | Thoen et al. |
| 2014/0213829 | A1 | 7/2014 | Tsai et al. |

FOREIGN PATENT DOCUMENTS

| | | |
|---|---|---|
| CN | 1284512 | 2/2001 |
| CN | 101117381 | 2/2008 |
| CN | 102344563 A | 2/2012 |
| CN | 102459405 | 5/2012 |
| CN | 106317341 | 1/2017 |
| EP | 1794210 B1 | 11/2012 |
| EP | 2119738 | 4/2014 |
| JP | 2000302729 | 10/2000 |

OTHER PUBLICATIONS

Carl Hanser Verlag, Tenside Surfactants Detergents, BASF Specialty Chemicals Competence and Know-How for Your High Quality Products, Journal for Theory. Technology and Application of Surfactants, Jan. 1996, pp. 63-68.
I. Hama et al., Preparation and Properties of Ethoxylated Fatty Methyl Ester Nonionics, JAOCS, vol. 72, No. 7, 1995, pp. 781-784.
International Search Report for International Application No. PCT/IB2018/056243; International filing date: Aug. 17, 2018; dated Dec. 4, 2018: 5 pages.
Written Opinion of the International Searching Authority for International Application No. PCT/IB2018/056243; International filing date: Aug. 17, 2018; dated Dec. 4, 2018; 11 pages.
Office Action issued in Corresponding Chinese Application No. 201880045021.1, dated Nov. 17, 2021.

\* cited by examiner

*Primary Examiner* — Terressa Boykin
(74) *Attorney, Agent, or Firm* — Norton Rose Fulbright US LLP

(57) ABSTRACT

A method of preparing a mono($C_{4-32}$ hydrocarbyl) ester of a mono($C_{1-4}$ alkyl)polyoxyalkylene glycol by contacting a $C_{1-4}$ alcohol and an alkylene oxide comprising ethylene oxide, propylene oxide, or a combination comprising at least one of the foregoing under conditions effective to provide a first mono($C_{1-4}$ alkyl)polyoxyalkylene glycol having a first average degree of polymerization; contacting the first mono ($C_{1-4}$ alkyl)polyoxyalkylene glycol and the alkylene oxide under conditions effective to provide a second mono($C_{1-4}$ alkyl)polyoxyalkylene glycol having a second average degree of polymerization that is higher than the first average degree of polymerization; and contacting the second ($C_{1-4}$ alkyl)polyoxyalkylene glycol and a $C_{4-32}$ carboxylic acid to provide the mono($CC_{4-32}$ hydrocarbyl) ester of a mono($C_{1-4}$ alkyl)polyoxyalkylene glycol.

18 Claims, No Drawings

METHOD OF PREPARING FATTY ACID MONOESTER OF POLYOXYETHYLENE, ESTER MADE THEREWITH, AND USES THEREOF

BACKGROUND

This disclosure relates to methods of preparing mono ($C_{4-32}$ hydrocarbyl) esters of a mono($C_{1-4}$ alkyl)polyoxyalkylene glycol, the mono($C_{4-32}$ hydrocarbyl) esters made by the methods, and their use.

Nonionic surfactants such as higher fatty acid esters of polyethylene glycol possess good water solubility, wettability, and penetration and lubrication action. As a result, these compounds are suitable surfactants and detergents for wetting, cleansing, penetrating, lubricating, and emulsifying applications. These include for example the textile and fiber industries. Furthermore, these fatty acid esters find use in the cosmetics and pharmaceutical industry owing to their general physiological inertia, i.e. lack to cause irritation to the human body.

In particular, the monoesters of higher fatty acid esters of polyethylene glycol exhibit good surface activity, solubilizing capacity and wetting properties and are effective detergents and emulsifiers. In general, the surface active properties of the polyethylene glycol fatty acid esters and the effectiveness of these compounds are governed in large measure by the degree of esterification of the reaction product. Since the polyethylene glycols possess two hydroxyl groups available for esterification, upon such reaction with an ester forming material, there may be formed either the monoester, di-ester, or a mixture thereof, depending upon the proportions of the reacting materials to each other and the conditions of reaction. It is well known in the art that the mono-ester and the di-ester of polyethylene glycol will show widely divergent characteristics as regards their surface active properties, water solubility, etc., even when the ester forming material employed in preparing these products is the same in each case. For example, the saturated higher fatty acid monoesters of polyethylene glycols having a molecular weight of approximately 400 and higher are completely soluble in water. In contrast, the saturated higher fatty acid di-esters of polyethylene glycols having a molecular weight of 1000 and lower are virtually water insoluble. Therefore, the presence of any substantial amount of the di-ester in admixture with the corresponding monoester would have a tendency to appreciably decrease the surface activity characteristic of the saturated higher fatty acid mono-esters of the polyethylene glycols, thereby seriously limiting the usefulness of these compounds.

Prior art methods of preparing these fatty acid monoesters of polyoxyethylene suffer from several known drawbacks such as lack of selectivity or slow reaction rates. Generally, in the direct esterification of the fatty acid and the glycol, the degree of esterification is controlled by the amount of the reactants employed, that is, in molecular relation to each other, and by the conditions governing the reaction. Thus, for example, if equimolar amounts of the fatty acid and polyethylene glycol are reacted under conditions favoring esterification, theoretically the monoester should essentially be formed in preference to the di-ester. Similarly, if two moles of the fatty acid are reacted with one mole of polyethylene glycol and a substantially complete reaction is obtained, only the di-ester is formed. However, it has been observed for certain prior art methods that in preparing the monoesters of the polyethylene glycols, substantial amounts of the di-ester are formed, even when the molar proportions of fatty acid to glycol are such as to favor the theoretical formation of only the monoester. Additionally, the direct reaction of ethylene oxide and fatty acid according to the prior art is slow and exhibits a low selectivity for monoester formation. Alternative prior art methods include the direct reaction of ethylene oxide with the methyl ester of higher fatty acids. However, even these methods, while having better selectivity than the aforementioned direct reaction of ethylene oxide and fatty acids, involve undesirably long reaction times.

There accordingly remains a need in the art for methods that provide mono($C_{4-32}$ hydrocarbyl) esters of mono($C_{1-4}$ alkyl)polyoxyalkylene glycols, in particular methods where these monoester glycols are obtained in a fast reaction with high selectivity.

SUMMARY

The above and other deficiencies are overcome by, in an embodiment, a method of preparing a mono($C_{4-32}$ hydrocarbyl) ester of a mono($C_{1-4}$ alkyl)polyoxyalkylene glycol, the method comprising: contacting a $C_{1-4}$ alcohol and an alkylene oxide comprising ethylene oxide, propylene oxide, or a combination comprising at least one of the foregoing under conditions effective to provide a first mono($C_{1-4}$ alkyl)polyoxyalkylene glycol having a first average degree of polymerization; contacting the first mono($C_{1-4}$ alkyl)polyoxyalkylene glycol and the alkylene oxide under conditions effective to provide a second mono($C_{1-4}$ alkyl)polyoxyalkylene glycol having a second average degree of polymerization that is higher than the first degree of polymerization; and contacting the second ($C_{1-4}$ alkyl)polyoxyalkylene glycol and a $C_{4-32}$ carboxylic acid to provide the mono($C_{4-32}$ hydrocarbyl) ester of a mono($C_{1-4}$ alkyl)polyoxyalkylene glycol.

Further disclosed are mono($C_{4-32}$ hydrocarbyl) esters of a mono($C_{1-4}$ alkyl)polyoxyalkylene glycol, specifically a mono $C_{8-28}$ fatty acid esters of a monomethyl polyoxyethylene glycol made by the methods described herein.

DETAILED DESCRIPTION

The inventors hereof have discovered methods of preparing mono($C_{4-32}$ hydrocarbyl)esters of mono($C_{1-4}$ alkyl)polyoxyalkylene glycols. In a key feature of the methods, these glycols are prepared in a three-step reaction. In a first step, a $C_{1-4}$ alcohol and an alkylene oxide are contacted in a first reactor to provide a first mono($C_{1-4}$ alkyl)polyoxyalkylene glycol (first glycol), i.e., intermediate. This intermediate is a low molecular weight glycol with a first average degree of polymerization. The first reactor in which this first step is carried out is a high-pressure reactor, preferably a small high-pressure reactor. The contacting can be at a first pressure of 0.5 to 2.5 megaPascal.

Next, the first glycol and the alkylene oxide are contacted in a second reactor to provide a second glycol. This second glycol is a high molecular weight glycol, i.e., with a second average degree of polymerization that is higher than the first average degree of polymerization. The second reactor in which this second step is carried out is a low-pressure reactor such as a normal-pressure reactor, preferably a larger normal-pressure reactor. The contacting is carried out at a second pressure that is lower than the first pressure. The second pressure can be 0.2 to 0.5 megaPascal.

Then, the second glycol and $C_{4-32}$ carboxylic acids are contacted, optionally in a third reactor, to provide the mono($C_{4-32}$ hydrocarbyl)ester of a mono($C_{1-4}$ alkyl)polyoxyalkylene glycol (third glycol). The third reactor can be a high- or low-pressure reactor, preferably a normal-pressure reactor.

It is therefore an advantage that the high molecular weight second glycol obtained in the second step can be produced in a low-pressure reactor, thereby avoiding the capital cost associated with large high-pressure reactors of the prior art. A high-pressure reactor is used only in the first step, and can be smaller than the reactors used in the second and third steps, thus further contributing to cost savings. In an additional advantage, the methods herein show better selectivity for the first and/or second glycol, less tendency to form undesirable fatty acid di-esters of polyoxyalkylene as by-products, and an overall higher reaction rate than the prior art methods.

The $C_{1-4}$ alcohol is a $C_{1-4}$ aliphatic alcohol, more preferably propanol, ethanol, methanol, most preferably methanol, or a combination comprising at least one of the foregoing. The alkylene oxide usually is a $C_{2-4}$ alkylene oxide, for example, ethylene oxide, propylene oxide, butylene oxide, preferably ethylene oxide, propylene oxide, or a combination comprising at least one of the foregoing.

The first glycol is a low vapor pressure material, i.e., a higher boiling point material. The boiling point can vary depending on the $R^1$ used and can be, for example, greater than 100° C., or greater than 120° C. Providing the first glycol in the first step, i.e., an alkoxylation reaction, in the first reactor, can be carried out in the presence of a first catalyst. Any alkoxylation catalyst will usually work in the alkoxylation reaction in the first step. It is preferred that the first catalyst is a base. Suitable bases include an alkali metal or alkaline earth metal alkoxide, preferably potassium or sodium methoxide, more preferably sodium methoxide, or a combination comprising at least one of the foregoing. The amount of catalyst is advantageously at least 0.005% by weight/total weight of the reagents and preferably ranges from 0.01% to 2% by weight/weight.

The first reactor can be a high-pressure reactor, preferably a small high pressure reactor having a capacity, for example, of 10 liters to 800 liters, or 200 to 800 liters. The first reactor can be any shape such as tubular, pot-shaped or tank shaped. It can be equipped with air and liquid inlets and outlets, a pressure gauge, agitator, heating coil, external heat exchanger, or other components known in the art. The temperature and pressure of the reaction in the first reactor can vary depending on the $R^1$ and alkylene oxide used, and can be, for example, 20 to 120° C., or 30 to 110° C., or 40 to 100° C.; and a pressure of 1 to 30 megaPascal (mPa) or 2 to 20 MPa, or 3 to 20 MPa. Under these conditions the reaction mixture in the first reactor can have a residence time of 15 to 180 minutes, preferably 30 to 120 minutes.

The first mono($C_{1-4}$ alkyl)polyoxyalkylene glycol is of the formula

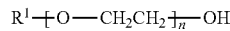

wherein $R^1$ is a residue of the $C_{1-4}$ alcohol, and n has an average value of 1 to 6, or 1 to 4, or 2 to 6, or 2 to 4. In an embodiment the first degree of polymerization is 1 to 4, preferably 1.5 to 2.5. Thus, the first glycol has a first average degree of polymerization of 6 or less or 4 or less. In an embodiment, the first average degree of polymerization is 1, 2, 3, 4, 5, or 6, or 1 to 4, or 1 to 6, preferably 1.5 to 2.5. The molecular weight of the first glycol can be measured by gel-permeation chromatography (GPC). In general, such GPC measurements provide a weight average molecular weight relative to a GPC standard. The weight average molecular weight for the first glycol can range from 77 to 250 Dalton, preferably 100 to 250 Dalton, or from 120 to 330 Dalton.

The first glycol can be isolated, for example from a crude first glycol present in the first reactor. The isolated first glycol can be transferred to the second reactor for commencement of the second step. In another embodiment, the first glycol is not isolated, and instead the crude first glycol is transferred to the second reactor and used directly.

The first glycol is subsequently reacted with the same or different alkylene oxide or combination of ethylene oxide and propylene oxide to provide the second glycol in the second step. The reaction can be carried out in the presence of a second catalyst. Any alkoxylation catalyst will usually work as the second catalyst, for example a base. Exemplary bases are an alkali metal or alkaline earth metal hydroxide, preferably potassium or sodium hydroxide, more preferably sodium hydroxide, or a combination comprising at least one of the foregoing. The amount of catalyst is advantageously at least 0.005% by weight/total weight of the reagents and preferably ranges from 0.01% to 2% by weight/weight. In an embodiment, the weight ratio of the first glycol to alkylene oxide is 1:1 to 1:50, preferably 1:1 to 1:20, more preferably 1:1 to 1:10.

The second reactor is preferably a normal-pressure reactor, and can be larger than the first reactor to accommodate the larger reaction mass, or to receive the contents of more than one batch of products from the first step. For example, it can have a capacity 1.2 to 10 times the capacity of the first reactor, or 2 to 10 times the capacity of the first reactor. The first reactor can be a high-pressure reactor, preferably a small high pressure reactor having a capacity, for example, of 10 liters to 100 liters. The second reactor can be any shape such as tubular, pot-shaped or tank shaped. It can be equipped with inlets, outlets, an agitator, heating coil, external heat exchanger as is known in the art.

It is to be understood that a normal pressure reactor as used herein includes atmospheric pressure, i.e., a reactor operating under atmospheric pressure or higher. In an embodiment, the pressure in the second reactor ranges from 0.05 to 0.2 mPa, or 0.1 to 0.15 mPa. The reaction temperature can vary depending on the $R^1$ used, can be, for example, 20 to 120° C., or 30 to 110° C., or 70 to 110° C. Under these conditions the reaction mixture in the first reactor can have a residence time in the range from 15 to 240 minutes, or 30 to 180 minutes.

The second mono($C_{1-4}$ alkyl)polyoxyalkylene glycol is of the formula

wherein $R_1$ is a residue of the $C_{1-4}$ alcohol, and m has an average value equal to or greater than 4, preferably 5 to 100, more preferably 8 to 50. Generally, the second glycol has a second average degree of polymerization of greater than 4 or greater than 6. In an embodiment, the second average degree of polymerization is 10 or more, preferably 15 or more, more preferably 20 or more, even more preferably 25 or more, even more preferably still 30 or more.

The second glycol accordingly has a higher molecular weight than the first glycol. For example, the weight average molecular weight of the second glycol can range from 300 to 20000 Dalton, preferably 300 to 8000 Dalton, more preferably 400 to 4000 Dalton, more preferably still 400 to 3000 Dalton, most preferably 500 to 2000 Dalton. The ratio of the weight average molecular weight of the first glycol to the second glycol is 1:1 to 1:100, preferably 1:2 to 1:100, more preferably 1:2 to 1:50, even more preferably 1:2 to 1:20.

The second glycol can be isolated, for example from a crude second glycol present in the second reactor. The isolated second glycol can be transferred to the second reactor for commencement of the third step. In another embodiment, the second glycol is not isolated, and instead the crude second glycol is transferred to the third reactor and used directly. In this third step the second glycol and the $C_{4\text{-}32}$ carboxylic acids are contacted, i.e. esterified to provide the third glycol.

The third step of the methods herein, i.e. esterification in the third reactor, can be carried out in the presence of a third catalyst. Usually any catalyst suitable for esterification reactions will work in the third step. Examples of esterification catalysts include acidic catalysts, for example Lewis acids such as inorganic or organic aluminum compounds, inorganic or organic titanium compounds, organic tin compounds, inorganic acids, organic acids, and the like. Specific examples of these include aluminum trichloride, tetraisopropyl titanate, tetra-n-butyl titanate, tetra-2-ethylhexyl titanate, titanium tetrachloride, tin oxalate, butyltin maleate, tin tetraethylate, concentrated sulfuric acid, methanesulfonic acid, ethanesulfonic acid, p-toluenesulfonic acid, preferably sulfuric acid, methanesulfonic acid, or a combination comprising at least one of the foregoing. The amount of catalyst is advantageously at least 0.005% by weight/total weight of the reagents and preferably ranges from 0.01% to 2% by weight/weight.

The third reactor is preferably a normal-pressure reactor, preferably a larger similar to the size of the second reactor. This reactor can be any shape such as tubular, pot-shaped or tank shaped. It can be equipped with liquid and air inlets and outlets, with an agitator, heating coil, external heat exchanger. In addition, the third reactor can be equipped with components to remove water during or after the third step, e.g., a distillation column. As is known in the art, water is a by-product in esterification reactions, and water is preferably removed during reaction so as to shift equilibrium of the reaction to the desired third glycols. Water removal techniques are well-known in the art and include stripping, application of vacuum, or sparging with an inert gas, for example nitrogen. Any of the aforementioned water removal techniques are suitable for the methods herein.

The temperature and pressure of the reaction in the third reactor can vary depending on the $R^1$ and alkylene oxide used, and can be, for example, 20 to 120° C., or 30 to 110° C., or 40 to 100° C.; and a pressure of 0.05 to 0.2 mPa, or 0.1 to 0.15 mPa. Under these conditions the reaction mixture in the first reactor can have a residence time of 15 to 240 minutes, or 30 to 180 minutes.

Completion of the esterification reaction, i.e. the third step, can be monitored by measuring acid value. It is understood by those skilled in the art that the lower the acid value, the more $C_{4\text{-}32}$ carboxylic acid has been consumed and, concurrently, third glycols have formed. The inventors hereof have discovered that the surface properties of these third glycols can be further improved by adjusting the reaction parameters such that the aforementioned third glycols have an acid value (AV) within the range of approximately 10 to 100, preferably 10 to 50 more preferably 10 to 20.

The $C_{4\text{-}32}$ carboxylic acid is of the formula

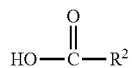

wherein $R^2$ is a substituted or unsubstituted, saturated or unsaturated $C_{5\text{-}31}$ aliphatic group, or a substituted or unsubstituted $C_{6\text{-}31}$ aromatic group, preferably wherein $R^2$ is a saturated or unsaturated $C_{7\text{-}31}$ aliphatic group. Suitable carboxylic acids also include saturated or unsaturated $C_{12\text{-}24}$ aliphatic carboxylic acid, preferably stearic acid, oleic acid, linoleic acid, linolenic acid, erucic acid, or a combination comprising at least one of the foregoing.

The mono($C_{4\text{-}32}$ hydrocarbyl) ester of a mono($C_{1\text{-}4}$ alkyl) polyoxyalkylene glycol is a compound of the formula

wherein $R^1$ is a residue of the $C_{1\text{-}4}$ alcohol; $R^2$ is a substituted or unsubstituted, saturated or unsaturated $C_{5\text{-}31}$ aliphatic group, or a substituted or unsubstituted $C_{6\text{-}31}$ aromatic group, preferably wherein $R^2$ is a saturated or unsaturated $C_{7\text{-}31}$ aliphatic group; and m has an average value of greater than 4, preferably 5 to 100, more preferably 8 to 50.

Contacting the $C_{1\text{-}4}$ alcohol and the alkylene oxide is in a first reactor, preferably a high-pressure reactor; contacting the first glycol and the alkylene oxide is in a second reactor, preferably a normal-pressure reactor; and contacting the second glycol and the $C_{4\text{-}32}$ carboxylic acid is in a third reactor, preferably a normal-pressure reactor.

In a specific embodiment, a method of preparing a mono $C_{8\text{-}28}$ fatty acid ester of a monomethyl polyoxyethylene glycol includes contacting methanol and ethylene oxide in the presence of a basic catalyst in a first high pressure reactor to provide a first monomethyl polyoxyethylene glycol having a first average degree of polymerization of less than or equal to 6, or less than or equal to 4; contacting the first monomethyl polyoxyethylene glycol and ethylene oxide in a second normal-pressure reactor to provide a second monomethyl polyoxyethylene glycol having a second average degree of polymerization greater than the first degree of polymerization, preferably greater than 4, or greater than 6; and contacting the second monomethyl polyoxyethylene glycol and a $C_{8\text{-}28}$ fatty acid in the presence of a catalyst, preferably an acidic catalyst, preferably tetraisopropyl titanate, tetra-n-butyl titanate, tetra-2-ethylhexyl titanate, titanium tetrachloride, concentrated sulfuric acid, methanesulfonic acid, ethanesulfonic acid, or p-toluenesulfonic acid, in a third normal-pressure reactor to provide the mono $C_{8\text{-}28}$ fatty acid ester of a methyl polyoxyethylene. In an embodiment, the first monomethyl polyoxyethylene glycol is not isolated.

In any of the foregoing embodiments, the first, second, or third steps can be conducted batchwise, semi-continuously or continuously to provide the third glycol. Preferably, at least the second step is conducted continuously, or all three steps are conducted continuously.

In an embodiment, mono($C_{4\text{-}32}$ hydrocarbyl)esters of a mono($C_{1\text{-}4}$ alkyl)polyoxyalkylene glycol or mono $C_{8\text{-}28}$ fatty acid esters of a monomethyl polyoxyethylene glycol are prepared in accordance with the above methods are produced efficiently with a lower capital cost. It is a further advantage of the above methods that mono($C_{4-32}$ hydrocarbyl)esters of a mono($C_{1-4}$ alkyl)polyoxyalkylene glycol and mono $C_{8-28}$ fatty acid esters of a monomethyl polyoxyethylene glycol are produced with high monoester selectivity. Additionally, the reaction is faster compared to the prior art methods which are sluggish and prone to furnishing to di-esters as undesirable by-products.

The glycols are suitable for applications including lipstick, deodorant stick, toilet soap, shaving soap, foundation make-up, beauty products, and the like. They can also be used as suspending agents and thickening agents in detergents and other household products. Additionally, such glycols can serve as the matrix of ointments, emulsions, ointments, lotions and suppositories in consumer goods or the pharmaceutical industry.

The following Examples are provided for illustrative purposes only and are not to be construed as limiting in any manner.

EXAMPLES

Example 1. Synthesis of Methoxypolyethylene Glycol (MPEG) 1200

Methanol (2.5 kg) was reacted with ethylene oxide (5.5 kg). 7.7 kg of low molecular weight methoxypolyethylene glycol intermediate (Me-2EO) formed. The Me-2EO intermediate was further reacted with 68.75 kg of ethylene oxide, yielding 76.25 kg of high molecular weight methoxypolyethylene glycol.

The product had an weight average molecular weight of 1220 g/mole as analyzed by gel permeation chromatography (GPC).

The methods and compositions are further illustrated by the following embodiments.

Embodiment 1

A method of preparing a mono($C_{4-32}$ hydrocarbyl) ester of a mono($C_{1-4}$ alkyl)polyoxyalkylene glycol, the method comprising: contacting a $C_{1-4}$ alcohol and an alkylene oxide comprising ethylene oxide, propylene oxide, or a combination thereof under conditions effective to provide a first mono($C_{1-4}$ alkyl)polyoxyalkylene glycol having a first average degree of polymerization of 1 to 6, or 1 to 4, or 2 to 6 or 2 to 4; contacting the first mono($C_{1-4}$ alkyl)polyoxyalkylene glycol and the alkylene oxide under conditions effective to provide a second mono($C_{1-4}$ alkyl)polyoxyalkylene glycol having a second average degree of polymerization that is greater than the first average degree of polymerization, preferably greater than 4 or greater than 6; and contacting the second ($C_{1-4}$ alkyl)polyoxyalkylene glycol and a $C_{4-32}$ carboxylic acid to provide the mono($C_{4-32}$ hydrocarbyl) ester of a mono($C_{1-4}$ alkyl)polyoxyalkylene glycol.

Embodiment 2

The method of embodiment 1, wherein the $C_{1-4}$ alcohol is a $C_{1-4}$ aliphatic alcohol, more preferably n-propanol, ethanol, methanol, or a combination comprising at least one of the foregoing, most preferably methanol.

Embodiment 3

The method of embodiment 1 or 2, wherein contacting the $C_{1-4}$ alcohol and the alkylene oxide, and the contacting the first mono($C_{1-4}$ alkyl)polyoxyalkylene glycol and the alkylene oxide is in the presence of a base, preferably an alkali metal or alkaline earth metal alkoxide, more preferably potassium or sodium methoxide, still more preferably sodium methoxide.

Embodiment 4

The method of any one or more of embodiments 1 to 3, wherein a weight ratio of the alcohol to the alkylene oxide is 1:1 to 1:8, preferably 1:1 to 1:5, more preferably 1:1 to 1:3, and a weight ratio of the first mono($C_{1-4}$ alkyl)polyoxyalkylene glycol to alkylene oxide is 1:1 to 1:50, preferably 1:1 to 1:20, more preferably 1:1 to 1:10.

Embodiment 5

The method of any one or more of embodiments 1 to 4, wherein the first mono($C_{1-4}$ alkyl)polyoxyalkylene glycol is of the formula

wherein $R_1$ is a residue of the $C_{1-4}$ alcohol, and n has an average value of 1 to 4, preferably 1.5 to 2.5; and the second mono($C_{1-4}$ alkyl)polyoxyalkylene glycol is of the formula

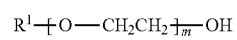

wherein $R_1$ is a residue of the $C_{1-4}$ alcohol, and m has an average value of greater than 4, preferably 5 to 100, more preferably 8 to 50.

Embodiment 6

The method of any one or more of embodiments 1 to 5, wherein a weight average molecular weight of the first mono($C_{1-4}$ alkyl)polyoxyalkylene glycol is 77 to 250 Dalton, preferably 100 to 250 Dalton, and a weight average molecular weight of the second mono($C_{1-4}$ alkyl)polyoxyalkylene glycol is 300 to 20000 Dalton, preferably 300 to 8000 Dalton, more preferably 400 to 4000 Dalton.

Embodiment 7

The method of any one or more of embodiments 1 to 6, wherein the $C_{4-32}$ carboxylic acid is of the formula

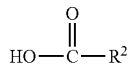

wherein $R^2$ is a substituted or unsubstituted, saturated or unsaturated $C_{3-31}$ aliphatic group, or a substituted or unsubstituted $C_{6-31}$ aromatic group, preferably wherein $R^2$ is an unsubstituted, saturated or unsaturated $C_{7-31}$ aliphatic group, preferably wherein the carboxylic acid is an unsubstituted saturated or unsaturated $C_{12-24}$ aliphatic carboxylic acid, preferably wherein the carboxylic acid is stearic acid, oleic acid, linoleic acid, linolenic acid, erucic acid, or a combination comprising at least one of the foregoing.

Embodiment 8

The method of any one or more of embodiments 1 to 7, wherein contacting the second mono($C_{1-4}$ alkyl)polyoxyalkylene glycol and the $C_{4-32}$ carboxylic acid is in the presence of a catalyst, preferably aluminum trichloride, tetraisopropyl titanate, tetra-n-butyl titanate, tetra-2-ethylhexyl titanate, titanium tetrachloride tin oxalate, butyltin maleate, tin tetraethylate, concentrated sulfuric acid, methanesulfonic acid, ethanesulfonic acid, p-toluenesulfonic acid, or a combination thereof, more preferably sulfuric acid or methanesulfonic acid.

Embodiment 9

The method of any one or more of embodiments 1 to 8, wherein the mono($C_{4-32}$ hydrocarbyl) ester of a mono($C_{1-4}$ alkyl)polyoxyalkylene glycol is a compound of the formula

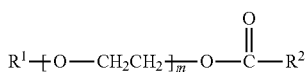

wherein $R^1$ is a residue of the $C_{1-4}$ alcohol; $R^2$ is a substituted or unsubstituted, saturated or unsaturated $C_{5-31}$ aliphatic group, or a substituted or unsubstituted $C_{6-31}$ aromatic group, preferably wherein $R^2$ is a saturated or unsaturated $C_{7-31}$ aliphatic group; and m has an average value of greater than 4, preferably 5 to 100, more preferably 8 to 50.

Embodiment 10

The method of any one or more of embodiments 1 to 9, wherein contacting the $C_{1-4}$ alcohol and the alkylene oxide is in a first reactor, preferably a high-pressure reactor; contacting the first mono($C_{1-4}$ alkyl)polyoxyalkylene glycol and the alkylene oxide is in a second reactor, preferably a low-pressure reactor; and contacting the second mono($C_{1-4}$ alkyl)polyoxyalkylene glycol and the $C_{4-32}$ carboxylic acid is in a third reactor.

Embodiment 11

The method of embodiment 10, wherein the first mono($C_{1-4}$ alkyl)polyoxyalkylene glycol is not isolated.

Embodiment 12

A mono($C_{4-32}$ hydrocarbyl)ester of a mono($C_{1-4}$ alkyl) polyoxyalkylene glycol prepared by the method of any one or more of embodiments 1 to 11.

Embodiment 13

A method of preparing a mono $C_{8-28}$ fatty acid ester of a monomethyl polyoxyethylene glycol, the method comprising: contacting methanol and ethylene oxide in the presence of a basic catalyst at a pressure of 0.5 to 2.5 megaPascal, to provide a crude first monomethyl polyoxyethylene glycol having a first average degree of polymerization of 1 to 6, or 1 to 4, or 2 to 6 or 2 to 4; contacting the crude first monomethyl polyoxyethylene glycol and ethylene oxide at a second pressure that is lower than the first pressure, and is 0.2 to 0.7 megaPascal, to provide a second monomethyl polyoxyethylene glycol having a second average degree of polymerization that is higher than the first degree of polymerization, and that is greater than 4, preferably greater than 6; and contacting the second monomethyl polyoxyethylene glycol and a $C_{8-28}$ fatty acid in the presence of a catalyst, preferably an acidic catalyst, more preferably tetraisopropyl titanate, tetra-n-butyl titanate, tetra-2-ethylhexyl titanate, titanium tetrachloride, concentrated sulfuric acid, methanesulfonic acid, ethanesulfonic acid, p-toluenesulfonic acid, or a combination thereof, in a third reactor to provide the mono $C_{8-28}$ fatty acid ester of the methyl polyoxyethylene.

Embodiment 14

The method of embodiment 14, wherein the first mono ($C_{1-4}$ alkyl)polyoxyalkylene glycol is not isolated.

Embodiment 15

The mono $C_{8-28}$ fatty acid ester of a monomethyl polyoxyethylene glycol prepared by the method of any one or more of embodiments 13 to 14.

In general, the invention can alternatively comprise, consist of, or consist essentially of, any appropriate components herein disclosed. The invention can additionally, or alternatively, be formulated so as to be devoid, or substantially free, of any components, materials, ingredients, adjuvants or species used in the prior art compositions or that are otherwise not necessary to the achievement of the function and/or objectives of the present invention.

The singular forms "a," "an," and "the" include plural referents unless the context clearly dictates otherwise. "Or" means "and/or." The endpoints of all ranges directed to the same component or property are inclusive and independently combinable. Disclosure of a narrower range or more specific group in addition to a broader range is not a disclaimer of the broader range or larger group. Unless defined otherwise, technical and scientific terms used herein have the same meaning as is commonly understood by one of skill in the art to which this invention belongs. A "combination" is inclusive of blends, mixtures, alloys, reaction products, and the like.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

As used herein, the term "hydrocarbyl" includes groups containing carbon, hydrogen, and optionally one or more heteroatoms (e.g., 1, 2, 3, or 4 atoms such as halogen, O, N, S, P, or Si), which can be present as one or more functional groups. "Aliphatic" means a straight chain or cyclic group containing carbon and hydrogen, and which may contain one or more unsaturations. "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—$CH_2$—) or propylene (—($CH_2$)$_3$—)). "Alkenyl" and "alkenylene" mean a monovalent or divalent, respectively, straight or branched chain hydrocarbon group having at least one carbon-carbon double bond (e.g., ethenyl (—HC=$CH_2$) or propenylene (—HC($CH_3$)=$CH_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —$C_nH_{2n-x}$— and —$C_nH_{2n-2x}$— wherein x is the number of cyclization(s). "Aryl" means a monovalent, monocyclic or polycyclic, aromatic group (e.g., phenyl or naphthyl). "Arylene" means a divalent, monocyclic or polycyclic, aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3) heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g., benzyl), $C_{7-12}$ alkylarylene (e.g., toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

While the invention has been described with reference to an exemplary embodiment or embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof.

What is claimed is:

1. A method of preparing a mono($C_{4-32}$ hydrocarbyl) ester of a mono($C_{1-4}$ alkyl)polyoxyalkylene glycol, the method comprising:
   contacting a $C_{1-4}$ alcohol and an alkylene oxide comprising ethylene oxide, propylene oxide, or a combination thereof under conditions effective to provide a first mono($C_{1-4}$ alkyl)polyoxyalkylene glycol having a first average degree of polymerization of 1 to 6, or 1 to 4, or 2 to 6, or 2 to 4;
   contacting the first mono($C_{1-4}$ alkyl)polyoxyalkylene glycol and the alkylene oxide under conditions effective to provide a second mono($C_{1-4}$ alkyl)polyoxyalkylene glycol having a second average degree of polymerization that is greater than the first degree of polymerization; and
   contacting the second ($C_{1-4}$ alkyl)polyoxyalkylene glycol and a $C_{4-32}$ carboxylic acid to provide the mono($C_{4-32}$ hydrocarbyl) ester of a mono($C_{1-4}$ alkyl)polyoxyalkylene glycol.

2. The method of claim 1, wherein the $C_{1-4}$ alcohol is a $C_{1-4}$ aliphatic alcohol.

3. The method of claim 1, wherein contacting the $C_{1-4}$ alcohol and the alkylene oxide, and the contacting the first mono($C_{1-4}$ alkyl)polyoxyalkylene glycol and the alkylene oxide is in the presence of a base.

4. The method of claim 1, wherein a weight ratio of the alcohol to the alkylene oxide is 1:1 to 1:8, and
   a weight ratio of the first mono($C_{1-4}$ alkyl)polyoxyalkylene glycol to alkylene oxide is 1:1 to 1:50.

5. The method of claim 1, wherein the first mono($C_{1-4}$ alkyl)polyoxyalkylene glycol is of the formula

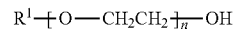

wherein
   R1 is a residue of the $C_{1-4}$ alcohol, and
   n has an average value of 1 to 4, preferably 1.5 to 2.5; and
the second mono($C_{1-4}$ alkyl)polyoxyalkylene glycol is of the formula

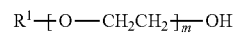

wherein
   $R_1$ is a residue of the $C_{1-4}$ alcohol, and
   m has an average value of greater than 4.

6. The method of claim 1, wherein a weight average molecular weight of the first mono($C_{1-4}$ alkyl)polyoxyalkylene glycol is 77 to 250 Dalton, preferably 100 to 250 Dalton, and
   a weight average molecular weight of the second mono(Ci-4 alkyl)polyoxyalkylene glycol is 300 to 20000 Dalton.

7. The method of claim 1, wherein the $C_{4-32}$ carboxylic acid is of the formula

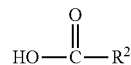

wherein $R^2$ is a substituted or unsubstituted, saturated or unsaturated $C_{3-31}$ aliphatic group, or a substituted or unsubstituted $C_{6-31}$ aromatic group.

8. The method of claim 1, wherein contacting the second mono($C_{1-4}$ alkyl)polyoxyalkylene glycol and the $C_{4-32}$ carboxylic acid is in the presence of a catalyst.

9. The method of claim 1, wherein the mono($C_{4-32}$ hydrocarbyl) ester of a mono($C_{1-4}$ alkyl)polyoxyalkylene glycol is a compound of the formula

wherein
   $R^1$ is a residue of the $C_{1-4}$ alcohol;
   $R^2$ is a substituted or unsubstituted, saturated or unsaturated $C_{5-31}$ aliphatic group, or a substituted or unsubstituted $C_{6-31}$ aromatic group; and
   m has an average value of greater than 4.

10. The method of claim 1, wherein contacting the $C_{1-4}$ alcohol and the alkylene oxide is in a first reactor;
   contacting the first mono($C_{1-4}$ alkyl)polyoxyalkylene glycol and the alkylene oxide is in a second reactor; and
   contacting the second mono($C_{1-4}$ alkyl)polyoxyalkylene glycol and the $C_{4-32}$ carboxylic acid is in a third reactor.

11. The method of claim 10, wherein the first mono($C_{1-4}$ alkyl)polyoxyalkylene glycol is not isolated.

12. A method of preparing a mono $C_{8-28}$ fatty acid ester of a monomethyl polyoxyethylene glycol, the method comprising:

contacting methanol and ethylene oxide in the presence of a basic catalyst at a pressure of 0.5 to 2.5 mega Pascal, to provide a crude first monomethyl polyoxyethylene glycol having a first average degree of polymerization of 1 to 6, or 1 to 4, or 2 to 6, or 2 to 4;

contacting the crude first monomethyl polyoxyethylene glycol and ethylene oxide at a pressure of 0.2 to 0.7 megaPascal, to provide a second monomethyl polyoxyethylene glycol having a second average degree of polymerization of greater than 4, or greater than 6; and contacting the second monomethyl polyoxyethylene glycol and a $C_{8-28}$ fatty acid in the presence of a catalyst, in a third reactor to provide the mono $C_{8-28}$ fatty acid ester of the methyl polyoxyethylene.

13. The method of claim 12, wherein the first monomethyl polyoxyethylene glycol is not isolated.

14. The method of claim 12, wherein the catalyst is aluminum trichloride, tetraisopropyl titanate, tetra-n-butyl titanate, tetra-2-ethylhexyl titanate, titanium tetrachloride tin oxalate, butyltin maleate, tin tetraethylate, concentrated sulfuric acid, methanesulfonic acid, ethanesulfonic acid, p-toluenesulfonic acid, or a combination comprising at least one of the foregoing.

15. The method of claim 1, wherein the second mono($C_{1-4}$ alkyl)polyoxyalkylene glycol has a second average degree of polymerization that is greater than 6;

wherein the $C_{1-4}$ alcohol is n-propanol, ethanol, methanol, or a combination comprising at least one of the foregoing;

wherein contacting the $C_{1-4}$ alcohol and the alkylene oxide, and contacting the first mono($C_{1-4}$ alkyl)polyoxyalkylene glycol and the alkylene oxide is in the presence of an alkali metal or alkaline earth metal alkoxide;

wherein a weight ratio of the alcohol to the alkylene oxide is 1:1 to 1:3; and wherein a weight ratio of the first mono($C_{1-4}$ alkyl) polyoxyalkylene glycol to alkylene oxide is 1:1 to 1:10.

16. The method of claim 15, wherein a weight average molecular weight of the first mono($C_{1-4}$ alkyl)polyoxyalkylene glycol is 100 to 250 Dalton;

wherein a weight average molecular weight of the second mono($C_{1-4}$ alkyl)polyoxyalkylene glycol is 400 to 4000 Dalton;

wherein the $C_{4-32}$ carboxylic acid is of the formula

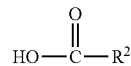

wherein $R^2$ is an unsubstituted, saturated or unsaturated $C_{7-31}$ aliphatic group; and wherein the carboxylic acid is stearic acid, oleic acid, linoleic acid, linolenic acid, erucic acid, or a combination comprising at least one of the foregoing.

17. The method of claim 16, wherein contacting the second mono($C_{1-4}$ alkyl)polyoxyalkylene glycol and the $C_{4-32}$ carboxylic acid is in the presence of sulfuric acid or methanesulfonic acid;

wherein the mono($C_{4-32}$ hydrocarbyl) ester of a mono ($C_{1-4}$ alkyl)polyoxyalkylene glycol is a compound of the formula

wherein
$R^1$ is a residue of the $C_{1-4}$ alcohol;
$R^2$ is a saturated or unsaturated $C_{7-31}$ aliphatic group; and
m has an average value of 8 to 50.

18. The method of claim 17, wherein
contacting the $C_{1-4}$ alcohol and the alkylene oxide is in a first reactor, the first reactor at a first pressure of 0.5 to 2.5 megaPascal;
contacting the first mono($C_{1-4}$ alkyl)polyoxyalkylene glycol and the alkylene oxide is in a second reactor, the second reactor at a second pressure that is lower than the first pressure; and
contacting the second mono($C_{1-4}$ alkyl)polyoxyalkylene glycol and the $C_{4-32}$ carboxylic acid is in a third reactor, the third reactor at atmospheric pressure.

* * * * *